(12) United States Patent
Man et al.

(10) Patent No.: US 8,911,547 B2
(45) Date of Patent: Dec. 16, 2014

(54) DECORATIVE PRODUCTS AND THE PRODUCTION METHODS THEREFOR

(75) Inventors: Ching Wah Man, Hong Kong (HK); Lai Kit Lau, Hong Kong (HK); King Lung Lee, Hong Kong (HK)

(73) Assignee: CompoClay Holdings Limited, Hong Kong (CN)

( * ) Notice: Subject to any disclaimer, the term of this patent is extended or adjusted under 35 U.S.C. 154(b) by 502 days.

(21) Appl. No.: 13/283,559

(22) Filed: Oct. 27, 2011

(65) Prior Publication Data

US 2012/0171429 A1 Jul. 5, 2012

Related U.S. Application Data (60) Provisional application No. 61/428,220, filed on Dec. 29, 2010.

(51) Int. Cl.
| C04B 9/00 | (2006.01) |
|---|---|
| C04B 12/00 | (2006.01) |
| C04B 28/34 | (2006.01) |
| C04B 111/00 | (2006.01) |

(52) U.S. Cl.
CPC ..... *C04B 28/348* (2013.01); *C04B 2111/00956* (2013.01)
USPC ............ 106/685; 106/686; 524/145; 264/426

(58) Field of Classification Search
USPC .................... 106/685, 686; 524/145; 264/426
See application file for complete search history.

(56) References Cited

U.S. PATENT DOCUMENTS

| 3,963,849 A | 6/1976 | Thompson |
|---|---|---|
| 4,772,654 A | 9/1988 | Stewart |
| 5,004,505 A | 4/1991 | Alley et al. |
| 5,110,361 A | 5/1992 | Alley et al. |
| 7,658,795 B2 | 2/2010 | Caine et al. |

FOREIGN PATENT DOCUMENTS

| CN | 1099366 A | 3/1995 |
|---|---|---|
| CN | 1111709 A | 11/1995 |
| CN | 1126708 A | 7/1996 |
| CN | 1252377 A | 5/2000 |
| CN | 1468753 A | 1/2004 |
| CN | 1900006 A | 1/2007 |
| CN | 101016214 A | 8/2007 |
| CN | 200958257 Y | 10/2007 |
| CN | 101148062 A | 3/2008 |
| CN | 101148064 A | 3/2008 |
| CN | 201086437 Y | 7/2008 |
| CN | 101423349 A | 5/2009 |
| CN | 101429001 A | 5/2009 |
| CN | 101429801 A | 5/2009 |
| CN | 101492278 A | 7/2009 |
| CN | 101492279 A | 7/2009 |
| CN | 101538141 A | 9/2009 |
| CN | 101565294 A | 10/2009 |
| WO | 2009/141325 A1 | 11/2009 |

OTHER PUBLICATIONS

Maravelaki-Kalaitzaki et al, Sorel's Cement Mortars Decay Susceptibility and Effect on Pentelic Marble, Cement and Concrete Research, 1999, 29(12): 1929-35.

*Primary Examiner* — Michael C Miggins
(74) *Attorney, Agent, or Firm* — Eagle IP Limited; Jacqueline C. Lui (57) ABSTRACT

Novel decorative products including interior home decorative products, garden ornaments, building decorative products and the like are disclosed in which the novel decorative products are characterized in having rigid shells of compacted fiber reinforced magnesium oxychloride composite, seam lines of below two millimeters and cores of which densities can be adjusted according to the preferred weight of the products during the product design stage. The aforesaid compacted fiber reinforced magnesium oxychloride composite is characterized in having compacted structures of F-5 MOC phase magnesium oxychloride. A method for producing the novel decorative products is also provided.

18 Claims, 7 Drawing Sheets

DECORATIVE PRODUCTS AND THE PRODUCTION METHODS THEREFOR

CROSS-REFERENCE TO RELATED APPLICATION

This application claims benefit under 35 U.S.C. §119(e) of U.S. Provisional Application having Ser. No. 61/428,220 filed Dec. 29, 2010, which is hereby incorporated by reference herein in its entirety.

FIELD OF THE INVENTION

This invention relates to molded magnesium oxychloride composite products, moldable magnesium oxychloride composite materials for manufacture of the molded products, and methods of producing the molded products.

BACKGROUND OF THE INVENTION

Decorative products are one of the ancient and elaborately artistic manifestations. Materials such as wood, rock, wrought iron, steel and silver are most conventional materials used for the production of decorative products. However, processing said conventional materials to produce decorative products with intricate carvings, inlayed works and embossed shape is time consuming and requires skillful labors. To tackle the problem, instead of using said conventional materials to produce decorative products, moldable materials, including ordinary Portland cement, plastics and polyresins, are used to produce decorative products nowadays.

However, there are also shortcomings for these moldable materials. Ordinary Portland cement, hereinafter referred to as OPC, is not a good choice for small to medium products that involve intricate carvings, inlayed works and embossed shape. Patterns such as wood grains are very difficult to be made by using OPC. Furthermore, decorative products produced by OPC are comparatively heavy. Plastics and polyresins are the most popular moldable materials which can be molded into different product shapes and textures. Moreover, both plastics and polyresins are comparatively lighter than said conventional materials. However, the production of plastics and polyresins involves the use of organic solvents which would pollute the environment. The residual organic solvents in decorative products may even be hazardous to human health. Furthermore, the combustibility and fire toxicant emission of plastics and polyresins on encountering fire make plastics and polyresins not the good choices for being the raw materials of decorative products.

SUMMARY OF THE INVENTION

In light of the foregoing background, it is an object of the present invention to provide an alternate material for production of decorative molded products.

According to a first aspect of the present invention, a moldable material is disclosed comprising a mixture of calcined magnesium oxide, magnesium chloride, phosphoric acid, sodium dihydrogenphosphate, calcium silicate, iron II sulphate, tributyl phosphate, activated silicon oxides, and fiber. In one exemplary embodiment, the moldable material has no internal voids with an enhanced fluidity property of a slump test value of at least 120 mm. In another exemplary embodiment, the fiber is E class glass fiber, plastic fibers, vegetal fibers, or a combination thereof; the silicon oxide is coal fly ash. In yet another exemplary embodiment, the composition of the moldable material is described in Table 1.

In yet another aspect, the moldable material described in the second paragraph of the Summary of the Invention is obtained by mixing the components of calcined magnesium oxide, magnesium chloride hexahydrate, water, phosphoric acid, sodium dihydrogenphosphate monohydrate, calcium silicate, iron H sulphate heptahydrate, tributyl phosphate, activated silicon oxides, polycarboxylate, and fiber at vacuum condition. In an exemplary embodiment, the composition of the moldable material is described in Table 1.

A moldable material is disclosed in another aspect of the present invention which comprises a mixture of calcined magnesium oxide, magnesium chloride, phosphoric acid, sodium dihydrogenphosphate, calcium silicate, iron II sulphate, tributyl phosphate, activated silicon oxides, fiber, polymethylhydrogensiloxane-polydimethylsiloxane and polycarboxylate. In an exemplary embodiment, the moldable material has an enhanced fluidity property with a slump test value of at least 160 mm. In another exemplary embodiment, the fiber is E class glass fiber, plastic fibers, vegetal fibers, or a combination thereof; the silicon oxide is coal fly ash. In yet another exemplary embodiment, the composition of the moldable material is described in Table 3.

In yet another aspect, the moldable material described in the fourth paragraph of the Summary of the Invention is obtained by mixing the components of calcined magnesium oxide, magnesium chloride hexahydrate, water, phosphoric acid, sodium dihydrogenphosphate monohydrate, calcium silicate, iron II sulphate heptahydrate, tributyl phosphate, polymethylhydrogensiloxane polydimethylsiloxane mixture, activated silicon oxides, polycarboxylate, and fiber at vacuum condition. In an exemplary embodiment, the composition of the moldable material is described in Table 3.

In yet another aspect of the present invention, a moldable material comprising a mixture of calcined magnesium oxide, magnesium chloride, sodium dihydrogenphosphate, calcium silicate, iron II sulphate, activated silicon oxides, fiber, and a foaming agent is disclosed. In one exemplary embodiment, the moldable material has an ability to expand the volume thereof by at least 50% and to decrease the density thereof by at least 25% and within a range of 0.8-1.5 kg/L.

In another exemplary embodiment, the fiber is E class glass fiber, plastic fibers, vegetal fibers, or a combination thereof; the silicon oxides is coal fly ash; the foaming agent is an inorganic foaming agent selected from a group consisting of hydrogen peroxide, aluminum powder, and sodium bicarbonate.

In yet another exemplary embodiment, the moldable material is obtained by a process comprising mixing the components of calcined magnesium oxide, magnesium chloride hexahydrate, water, phosphoric acid, sodium dihydrogenphosphate monohydrate, calcium silicate, iron II sulphate heptahydrate, activated silicon oxides, fiber, and foaming agent at atmospheric condition. In an exemplary embodiment, the composition of the moldable material is described in Table 2.

In a further aspect of the present invention, a paste shaping tool is disclosed in which it is used for minimizing the width of seam lines of molded products using at least two mold parts, comprising a panel with at least one hole having a contour matching the contour of the parting line of each of the two mold parts. In one exemplary embodiment, the width of the seam lines is less than 2 mm.

A molded product is disclosed in another aspect of the present invention, comprising seam lines of less than 2 mm after curing, a plurality of rigid shells comprising compacted fiber reinforced magnesium oxychloride composite, and at least a core. In one exemplary embodiment, the density of the core is selected for achieving a predetermined weight of the product.

In a further exemplary embodiment, the compacted fiber reinforced magnesium oxychloride comprises crystalline phase of $5Mg(OH)_2.MgCl_2.8H_2O$ compacted at vacuum condition and stabilized by tributyl phosphate and calcium silicate; the seam lines are foamed fiber reinforced magnesium oxychloride composite; and the core is wood, stones, metals, paper, gas, or foamed fiber reinforced magnesium oxychloride composite.

In another exemplary embodiment, the rigid shells further comprise intricate carvings, inlayed works and embossed shape. The dimensions of said intricate carvings, inlayed works and embossed shape can be as small as 2 mm. In yet another exemplary embodiment, the molded product is incombustible according to ASTM E136, is free of volatile organic compound emission according to ASTM D5116 and is good to resist weathering according to ASTM C666 and ASTM G154.

In one exemplary embodiment, the molded product is able to absorb carbon dioxide from the atmosphere through the carbonation of said rigid shells. In yet another exemplary embodiment, at least one core is a porous core and seam lines provide a pathway for carbon dioxide in the atmosphere to reach the high surface area of said porous core; the porous core absorbs carbon dioxide at a faster rate than said rigid shells.

According to another aspect of the present invention, a method of producing a molded product is disclosed which comprises the steps of: (a) vacuuming a first paste of the moldable material described in any one of the embodiments in paragraph the second paragraph of the Summary of the Invention; (b) casting the vacuumed first paste onto a female mold of a mold assembly; (c) casting the vacuumed first paste onto a male mold of the mold assembly; (d) mixing a second paste of the moldable material described in any one of the embodiments in the sixth paragraph of the Summary of the Invention; (e) casting the second paste onto the first paste casted on the female mold obtained from step (b); (f) assembling the male mold obtained from step (c) and the female mold obtained from step (e); (g) allowing the second paste to expand and squeeze out from a gap between the assembled male and female molds; and (h) curing the first paste and the second paste inside the assembled male and female molds obtained from step (g) to from inc molded product.

In an exemplary embodiment, the method further comprises the steps of: (i) clearing the excess second paste squeezed out from said gap of step (g) on the mixed paste; (j) demolding to obtain the molded product; (k) fixing surface defects on the molded product obtained from step (j); and (l) providing painting onto the molded product obtained from step (k) to yield desired surface finishing effects.

A method for producing a molded product is disclosed in a further aspect of this invention, comprising the steps of: (a) casting a first paste onto a core; (b) applying a fiber mat onto the casted first paste; (c) casting a second paste onto the casted first paste and the fiber mat to form a casted core; (d) assembling the mold parts around the casted core; (e) vacuuming a third paste; (f) filling the remaining cavity of the assembled mold obtained from step (d) with the third paste obtained from step (e) to form a filled assembled mold; (g) vacuuming the filled assembled mold; (h) curing and setting the filled assembled mold at atmospheric condition; and (i) demolding the filled assembled mold to form the molded product.

In an exemplary embodiment, the first paste is the moldable material as described in any one of the embodiments in the second paragraph of the Summary of the Invention or the fourth paragraph of the Summary of the Invention the second paste is the moldable material as described in any one of the embodiments in the second paragraph of the Summary of the Invention or the fourth paragraph of the Summary of the Invention; the third paste is the moldable material as described in any one of the embodiments in the second paragraph of the Summary of the Invention or the fourth paragraph of the Summary of the Invention.

In another aspect of this invention, a method for producing a molded product is provided comprising the steps of: (a) assembling the paste shaping tool as described in the ninth paragraph of the Summary of the Invention; (b) casting a first paste onto the assembled first mold part; (c) applying a fiber mat onto the casted first paste obtained from step (b); (d) casting a second paste onto the casted first paste obtained from step (c); (e) removing the paste shaping tool from the assembled first mold part to form a casted first mold part; (f) assembling the paste shaping tool as described in the ninth paragraph of the Summary of the Invention and a second mold part, wherein said second mold part is adapted to couple with said first mold part; (g) casting the first paste onto the assembled second mold part; (h) applying a fiber mat onto the casted first paste obtained from step (g); (i) casting the second paste onto the casted first paste obtained from step (h) to form a casted second mold part; (j) assembling the casted first mold part obtained from step (e) and the casted second mold part obtained from step (i); (k) curing and setting the filled assembled mold obtained from step (j) at atmospheric condition; and demolding the filled assembled mold to form the molded product.

In one exemplary embodiment, the first paste is the moldable material as described in any one of the embodiments in the second paragraph of the Summary of the Invention or the fourth paragraph of the Summary of the Invention; the second paste is the moldable material as described in any one of the embodiments in the second paragraph of the Summary of the Invention or the fourth paragraph of the Summary of the Invention. In yet another exemplary embodiment, the first paste and/or said second paste is vacuumed.

BRIEF DESCRIPTION OF THE FIGURES

A preferred embodiment of the present invention will now be described, by way of an example only, in conjunction with the accompanying figures wherein like reference numerals designate like parts throughout, in which.

DETAILED DESCRIPTION OF THE PREFERRED EMBODIMENTS

As used herein and in the claims, "comprising" means including the following elements but not excluding others.

The terms "molded product", "molded magnesium oxychloride composite product", "decorative products", or "decorative molded products" used herein and in the claims mean including interior home decorative products, garden ornaments, building decorative products and the like.

Any chemical as used herein and in the claims is interpreted as any specific hydrate form thereof. As such, any hydrate form or even the anhydrous form of such chemical should also be considered to be included therein. The term "hydrate" referred herein and in the claims includes water molecule(s) either bound to or crystallized with the chemical associated therewith. For example, "sodium dihydrogenphosphate" should be interpreted to include the anhydrous sodium dihydrogenphosphate, sodium dihydrogenphosphate monohydrate, or any other hydrate forms thereof.

The term "vacuuming" or "vacuumed" used herein and in the claims bears the meaning of treating or mixing the specified object at vacuum conditions.

The term "seam line(s)" of a molded product as used herein and in the claims refer to the "scar" remains on the molded products where the mold parts join during the assembling of the mold parts.

As afore-described, the present invention uses fiber reinforced magnesium oxychlorides as main components to produce decorative products with intricate carvings, inlayed works and embossed shape by using molding technique.

Magnesium oxychloride (MOC) is a type of hydraulic cement produced by mixing powdered magnesium oxide with a solution of magnesium chloride. If the ratio of magnesium oxide and magnesium chloride is within a certain range of ratios, when cured, MOC comprises mainly crystalline phase of $5Mg(OH)_2 \cdot MgCl_2 \cdot 8H_2O$ (hereinafter referred to as F-5 MOC). Having a high content of F-5 MOC, MOC possesses high fire resistance, low thermal conductivity, good abrasion resistance and good organic solvent resistance. In addition, MOC is environmental friendly as it requires comparatively lower energy in the production process than ordinary Portland cement, and F-5 MOC can absorb carbon dioxide in the atmosphere through carbonation according to Maravelaki-Kalaitzaki and Moraitou 1999.

A number of inventions have previously disclosed the application of MOC in different aspects. For example, Chinese Patent No. 1126708A discloses a production method for producing fire-proof board using MOC as one of the main ingredients. The MOC used in this patent comprises magnesium oxide, magnesium chloride, urea formaldehyde and vegetal fiber. The MOC is pressed to form a board structure with fiber glass mat by using a roller press machine. Chinese Patent No. 1099366A also discloses the use of MOC paste to produce composite board with the property of fire-proofing. The MOC used in this patent comprises magnesium oxide, magnesium chloride, activated silicon dioxide, vegetal fiber and a mixture of organic glue and ionic salts. The MOC paste is pressed to form a compressed board structure using a cold press machine.

In addition, Chinese Patent Publication Nos. 101429001A, 101016214A, 201086437Y, 101538141A, 101429801A, 101148062A, 101148064A, 101565294A, 101423349A, 101492279A, 101492278A, U.S. Pat. Nos. 5,004,505, 5,110,361, 3,963,849, 4,772,654, and PCT International Publication No. 2009141325A1 disclose different formulations and production methods of MOC composites. Each of these publications uses formulations of MOC with single set of selected properties to produce the targeting products. The utilization of MOC to produce decorative products with intricate carvings, inlayed works and embossed shape has not been disclosed in aforementioned publications.

Further, Chinese Patent Publication No. 200958257Y discloses a composite board that comprises two selected formulations of MOC cement with different densities so as to lower the weight of the products and keep the surface of the products with enough strength. However, the utilization of two selected formulations of MOC cement with different densities to produce decorative products that requires the assembly of molds has not been disclosed in this publication.

To ensure a high content of F-5 MOC, the tuning of the ratio of raw materials of MOC is essential and has been previously disclosed. For instance, U.S. Pat. No. 7,658,795B2 discloses ways to produce MOC with at least 80% F-5 MOC by tuning the ratio and species of the raw materials. However, despite the right composition, the production method also plays a key role in achieving MOC with a stable structure. MOCs are often casted onto the molds in random motion by hand casting and spray casting. Hand casting is a method to apply the moldable materials onto the molds by brushing the moldable materials onto the molds. Spray casting is a method to apply the moldable materials onto the molds by spraying the moldable materials. Chinese Patent Number 1111709A discloses a method to produce composite door by coating a layer of MOC paste onto a wooden door frame by hand casting. Chinese Patent Number 1252377A discloses a method to produce cover of a well by pouring MOC paste into a steel framework. Further, Chinese Patent Number 1900006A discloses the production method of a colored composite material by casting of MOC paste and coupling agent solution alternatively using hand casting method.

Unlike hand casting and spray casting, pressing is a way to cast MOC paste for the purpose of producing better structured MOC. For example, Chinese Patent Numbers 1126708A, 1099366A and 1468753A utilize presses to form a composite material. However, press casting is not an efficient method to eliminate the possible gas bubbles and voids inside the MOC paste.

Vacuum casting and low-pressure filling are used in metal and resins casting in which vacuum casting eliminates turbulence, increases density, repeatability, tolerances, and grain uniformity. Moreover, as the feedstock is drawn from below to the top of the pool, the feedstock is free from dross and slag. The pressure differential helps the feedstock to flow into every intricacy of the mold. However, the application of vacuum casting on the casting of MOC paste has not been found because, conventionally, vacuum casting of MOC induces several technical problems and unfavorable product qualities. Some of the technical problems include the relative low fluidity of common MOC pastes, the technical difficulties in handling the mortar that contains certain amount of fiber, aggregates and sands and the deferred setting time of vacuum treated high-fluidity MOC pastes. Examples of unfavorable product qualities are high mass and low dimensional strength. As the feedstock is fed into the mold cavity by suction in a vacuum condition, products that produced by vacuum casting are always associated with high mass. Furthermore, there is no way to apply fiber mat under vacuum condition for conventional vacuum casting process. Thus, the strength and dimensional stability of the products are worse than that produced by hand casting and spray casting.

To the best knowledge of the inventors of the instant invention, the molds are always pre-assembled prior to the injection of moldable materials. The moldable materials are then injected into the mold cavity through a port; thus, the products will have a scar at the port location. In order to make light product, blow molding or spin molding has to be used. However, due to the long setting time of OPC and MOC pastes, blow molding and spin molding are impossible for OPC and MOC. As a result, decorative products made from OPC and MOC are seldom hollow. The current hollow products available in the market comprise obvious seam lines at the location where different pieces of mold assemble.

Summarizing the existing art, treating MOC paste under vacuum to generate compacted fiber reinforced MOC products as described in this invention has not been previously disclosed. The decorative products as described in this invention and resulted from this production method possess all the afore-discussed advantages that conventional MOC products may lack. Furthermore, none of the existing art has described methods to minimize the width of seam lines on the final products.

The present invention is directed to a category of novel decorative products characterized in having rigid shells of compacted fiber reinforced magnesium oxychloride composite, seam lines of less than two millimeters and cores in which densities thereof can be adjustable. In one embodiment, the density of the core is adjusted according to the preferred weight of the products during the product design stage. The afore-said compacted fiber reinforced magnesium oxychloride composite is characterized in comprising compacted structures of F-5 MOC phase magnesium oxychloride. With the rigid shell, the novel decorative products are non-combustible, volatile emission free, heavy metal leaching free, mold and insect resistant, and carbon dioxide absorbing.

Figure 1A:
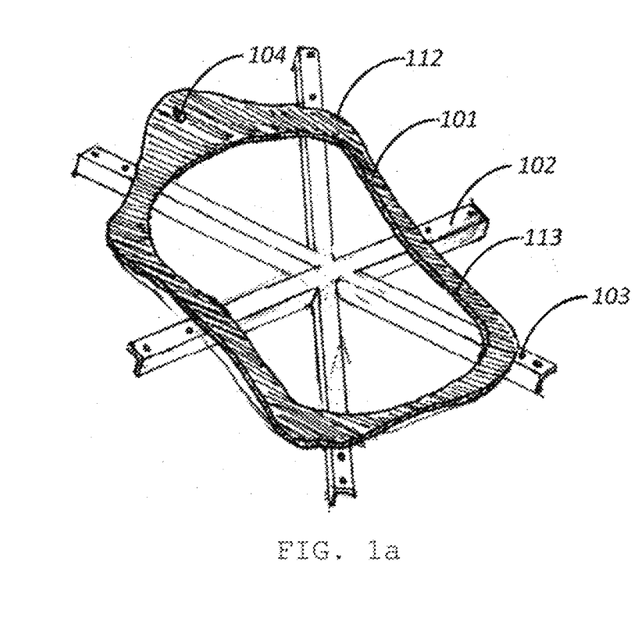
FIGS. 1a-1b shows a mold for making a decorative molded product, as is a mirror frame as illustrated, according to a preferred embodiment of the present invention.
Figure 1B:
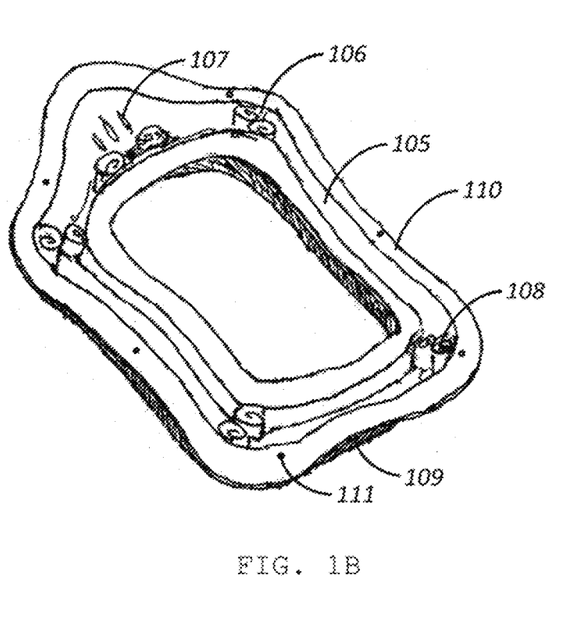

FIGS. 1a-1b show a mold for making mirror frames as an example of the decorative product according to one embodiment of the instant invention. Said mold comprises a male mold (101) made from conventional molding material, including silicon rubber, polyurethane, resins and polyvinylchloride, preferably a rigid mold using polyresins. Said male mold (101) is also preferred to be a plate-like structure. Said male mold (101) is supported by a backing frame (102) which prevents the male mold (101) from distortion and fixes the position of said male mold (101) by providing a male hole (103) for any means to adjust and fix the position of male mold (101) when assembling with a female mold (105). Said male mold (101) also comprises fixing positions (104) for immersing the fixing fittings of the mirror frame. The female mold (105) comprises complicated intricate carvings (106), inlayed works (107) and embossed shape (108). Molding material including silicon rubber, polyurethane, resins and polyvinylchloride, can be used for the female mold (105), while flexible and soft material like silicon rubber or polyurethane is preferred. As soft material is used as the building material of said female mold (105), it is essential to have a support (109) for the female mold (105). The female mold (105) also comprises an extended section (110) and a female hole (111) corresponding to the male hole (103) on the male mold (101) is provided thereon. Unlike conventional molds, after assembling of the male mold (101) and female mold (105), the gap in between the male mold and the female molds are intended to be larger than 0.2 millimeters and smaller than 2 millimeters, preferably around 0.5 millimeters, in the current mold design as shown in FIG. 1. With that configuration, the edges (112, 113) of the male mold (101) are not in contact with the female mold (105) after mold assembly.

Figure 2:
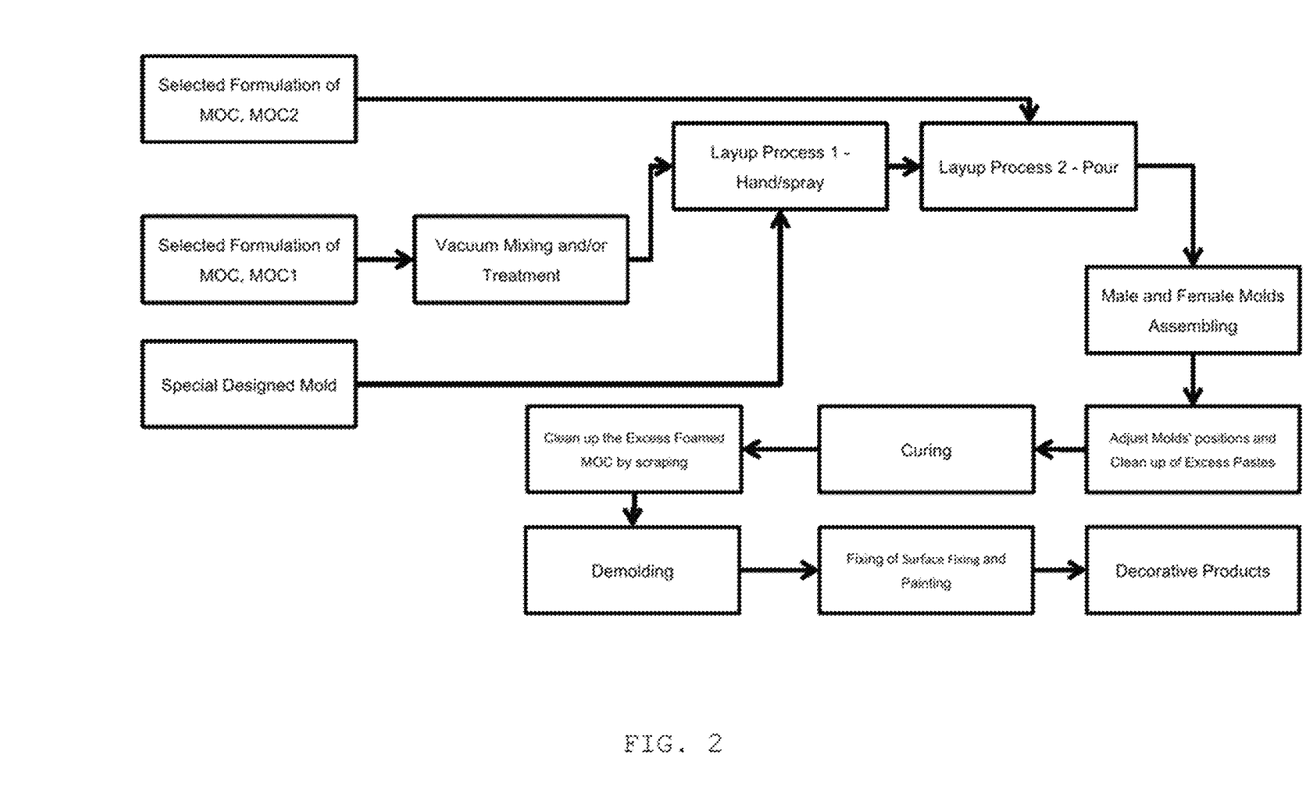
FIG. 2 illustrates a process flow of production method of decorative molded products according to a preferred embodiment of the present invention.
Figure 3A:
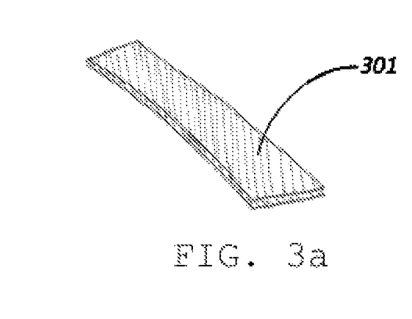
FIGS. 3a-3i are graphical illustrations of the utilization of a mold in a production method of decorative molded products according to a preferred embodiment of the present invention.
Figure 3B:
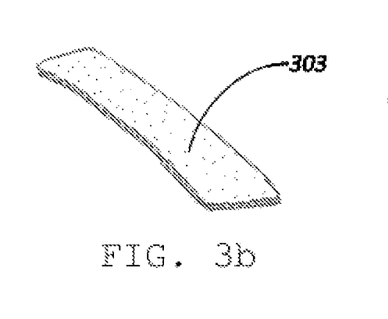
Figure 3C:
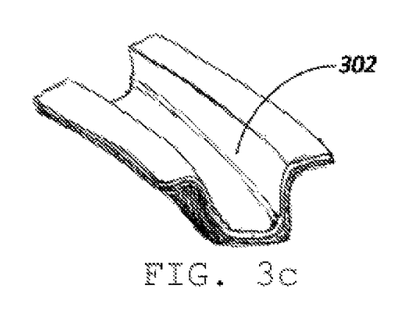
Figure 3D:
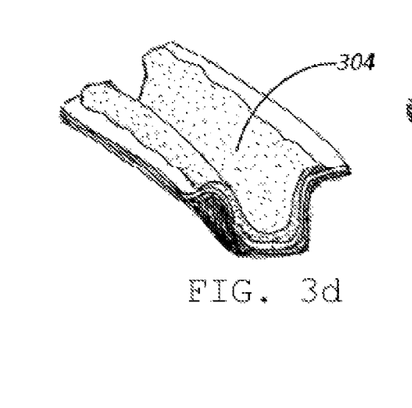
Figure 3E:
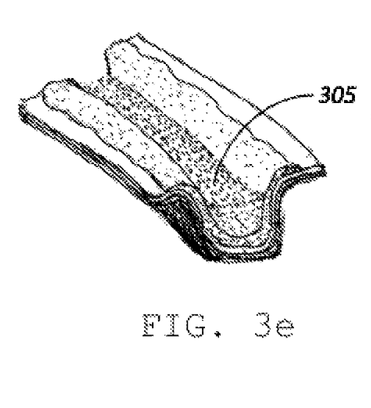
Figure 3F:
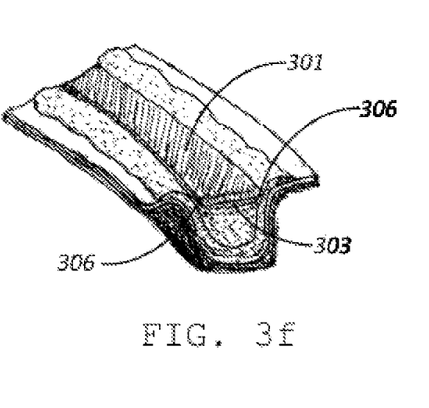
Figure 3G:
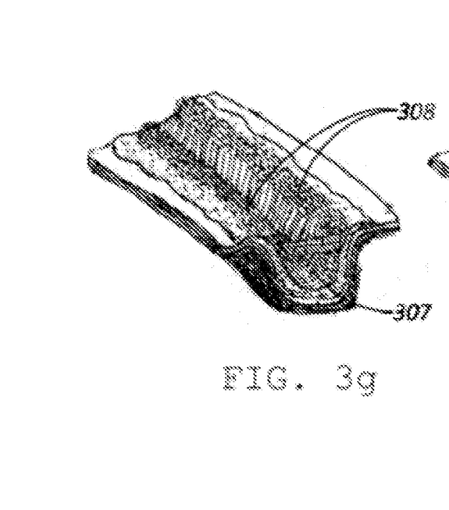
Figure 3H:
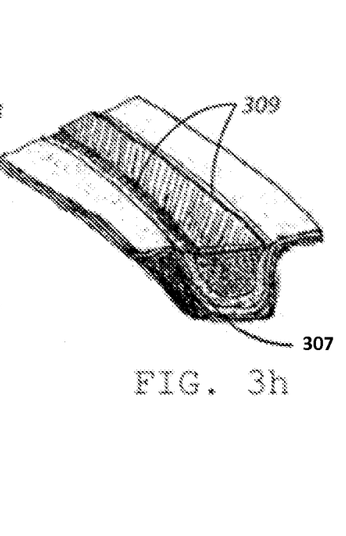
Figure 3I:
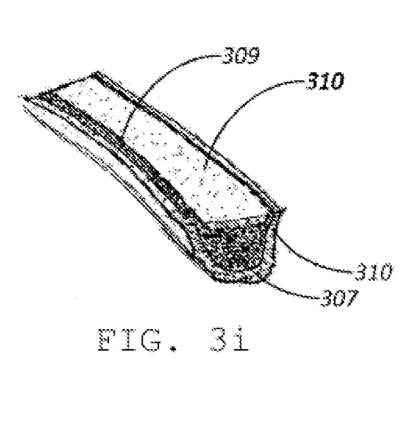

FIG. 2 illustrates a production method of decorative molded products, for example an interior home decorative product such as mirror frame, according to one preferred embodiment of the present invention. A selected formulation of fiber reinforced MOC (MOC1) is first mixed under vacuum condition using a vacuum mixer or the like for 10-15 minutes. In one exemplary embodiment, the composition of said MOC1 is listed in Table 1 below. Due to the addition of calcium silicate and tributyl phosphate in the said selected formulation, formation of F-5 MOC is enhanced and the formed F-5 MOC is stabilized and arranged in good structure during vacuum treatment. MOC1 resulted from said vacuum mixing is characterized in having no internal voids and possessing a fluidity of slump test value of 120-140 millimeters in one preferred embodiment. The MOC paste resulted from said vacuum mixing process is casted on both male mold (101) and female mold (105) (both molds are shown in FIG. 1) by hand casting or spray casting.

Another selected formulation of fiber reinforced MOC paste (MOC2) is prepared and mixed at atmospheric condition for 10-15 minutes. In one exemplary embodiment, the composition of said MOC2 is listed in Table 2 below. Hydrogen peroxide or aluminium powder is introduced to the pastes to provide the self-expanding property of MOC2. In one preferred embodiment, MOC2 is characterized in having an ability to expand its volume by at least 1.5 times, and the resulting density decreases about 25 percent without any external force exerted thereon within two hours after the mixing process. The extent of reduction of density can be adjusted within the range of 0.8-1.5 kilograms per liter by altering the dosage of hydrogen peroxide or aluminium powder in another preferred embodiment. The said expansion stops within three hours after the mixing process in one preferred embodiment. MOC2 is casted on top of the casted MOC1 paste of the female mold (105) and fills up at least 75 percent of the remaining cavity of the female mold (105) after said mixing at the atmospheric condition. Prior to the complete expansion of MOC2, the male mold (101) and female mold (105) are assembled. The positions of the male mold (101) and female mold (105) can be adjusted accordingly during the mold assembling period. Excess MOC pastes, including excess MOC1 and MOC2 pastes, are cleaned up by scraping after the assembly of male mold and female mold and prior to the curing process. The pastes are then allowed to cure at atmospheric condition. During the curing process, the self-expanding paste (i.e. MOC2) expands and escapes the mold cavity through the gaps between the male mold (101) and the female mold (105). After final setting of both said selected formulation of MOC pastes, the expanded paste forms foamed MOC with density of at least 75% of the non-foamed paste. The excess foamed MOC paste which squeezed out from the mold cavity is scraped. The paste squeezed from the gap is foamed MOC and the foamed MOC paste forms seam lines of 0.2-2 millimeters; thus, it is easy to be scrapped. Finally, any surface deflects identified after demolding of the mirror frame is fixed and the fixed mirror frame is painted according to the preferred surface finishing.

TABLE 1

| Ingredients | Composition (weight percent) |
| --- | --- |
| Calcined Magnesium Oxide (Activity of above 58 weight percent) | 49-51 |
| Magnesium Chloride Hexahydrate (Purity of above 95 weight percent) | 17-19 |
| Water | 17-19 |
| Phosphoric Acid (Purity of above 80 weight percent) | 0.2-0.5 |
| Sodium Dihydrpogenphosphate Monohydrate (Purity of above 98 weight percent) | 0.1-0.2 |
| Calcium Silicate (Purity of above 90 weight percent) | 0.5-1.0 |
| Iron II Sulphate heptahydrate (Purity of above 95 weight percent) | 0.8-1.0 |

TABLE 1-continued

| Ingredients | Composition (weight percent) |
| --- | --- |
| Tributyl phosphate (Purity of above 90 weight percent) | 0.5-1.0 |
| Activated Silicon Oxides (including Coal Fly Ash) (Activity of around 50 weight percent) | 5.0-12.0 |
| E Class Glass Fiber (can be replaced by Plastic fibers or vegetal fibers) | 0.5-1.0 |

TABLE 2

| Ingredients | Composition (weight percent) |
| --- | --- |
| Calcined Magnesium Oxide (Activity of above 58 weight percent) | 49-51 |
| Magnesium Chloride Hexahydrate (Purity of above 95 weight percent) | 17-19 |
| Water | 17-19 |
| Phosphoric Acid (Purity of above 80 weight percent) | 0.2-0.5 |
| Sodium Dihydrogenphosphate Monohydrate (Purity of above 98 weight percent) | 0.1-0.2 |
| Calcium Silicate (Purity of above 90 weight percent) | 0.5-1 |
| Iron II Sulphate Heptahydrate (Purity of above 95 weight percent) | 0.8-1 |
| Hydrogen Peroxide (Purity of about 30 weight percent) | 1.0-2.0 |
| Activated Silicon Oxides (including Coal Fly Ash) (Activity of around 50 weight percent) | 5.0-12.0 |
| E Class Glass Fiber (can be replaced by Plastic fibers or vegetal fibers) | 1.0-2.0 |

FIGS. 3a-3i demonstrates the utilization of a segment (301) of the male mold (101) (not shown in FIGS. 3a-3i) and a segment (302) of the female mold (105) (not shown in FIGS. 3a-3i) in the production of mirror frames as an example of the decorative product according to one embodiment of the instant invention. A selected MOC paste (MOC1) (303, 304) after vacuum mixing is casted onto the male mold segment (301) and female mold segment (302) by hand casting or spray casting, and the preferred thickness of the casting is between 0.2-5 millimeters. Another selected MOC paste (MOC2) (305) is mixed under atmospheric condition and casted only on top of the casted MOC1 paste (304) casted in the female mold segment (302). In a preferred embodiment, the MOC2 paste (305) is preferred to fill up at least 75 percent of the remaining cavity of the female mold (105). The male mold (101) and the female mold (105) are then assembled such that the male mold segment (301) and female mold segment (302) are therefore assembled. The assembled mold segments possess a gap (306) between the male mold segment (301) and the female mold segment (302). The MOC1 paste (303) on the male mold segment (301) may not be in contact with the MOC2 paste (305) casted on the female mold (105). In another preferred embodiment, excess casted paste can be cleaned up prior to or after the curing and setting process of the MOC1 paste (303) and MOC2 pate (305) by scraping. During the curing and setting process, the MOC2 paste (305) expands and fills up the remaining mold cavity by forming a foamed and porous core structure (307). During the expansion of MOC2 paste (305), some of the foamed paste (308) is squeezed out through the gap (306) to form gas permeable parting lines (309) of the final decorative products after scraping of unwanted pastes. After demolding, the decorative product comprises rigid shells (310) that are formed by compact F5 MOC, gas permeable parting lines (309) and a porous core (307).

As the mirror frame, an example of the decorative product of the present invention, possesses rigid shells which are formed by vacuum treatment of a selected MOC paste, the shells of the mirror frame possess high strength and the ability to prevent water and chemical penetrations that would otherwise deteriorate the quality of the mirror frame. In addition, it is found that the rate of carbonation of the vacuum treated MOC paste is slower than that of MOC paste with the same formulation which is mixed under atmospheric condition. The reason would be related to the elimination of air, and thus the carbon dioxide, from the MOC paste in the vacuum mixing process and the compacted phase structure formed during the vacuum treatment of the MOC pastes. The gas permeable parting lines allow the air from the atmosphere to reach the porous core, thus providing high surface area for the carbon dioxide absorbing MOC to absorb carbon dioxide through carbonation. As said porous core made of MOC paste does not contribute much to the strength of the mirror frame, said carbonation of the porous core does not pose any durability problem to the mirror frame. Furthermore, because of the properties of non-combustibility in accordance with ASTM E136, free of volatile organic compound emission in accordance with ASTM D5116, free of heavy metal leaching and resistance of mold and insect of the selected formulations of MOC, the mirror frame possesses environmentally friendly, safe and durable features.

Figure 4A:
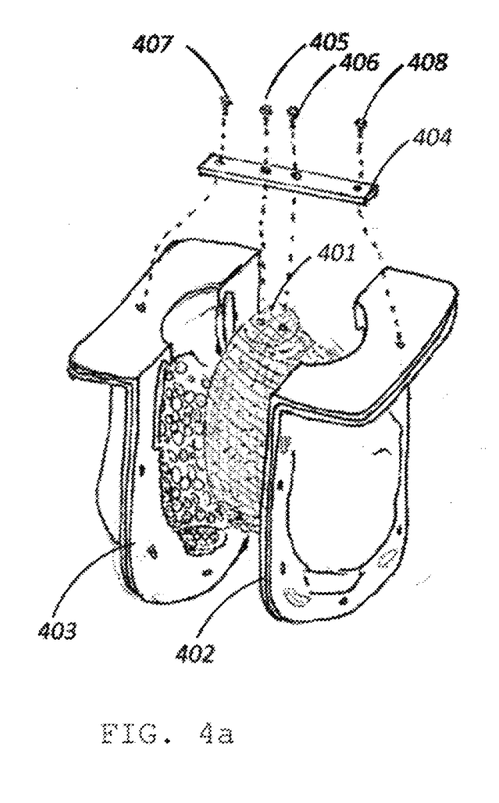
FIGS. 4a-4c illustrate a production method of an ornamental molded product according to a preferred embodiment of the present invention.
Figure 4B:
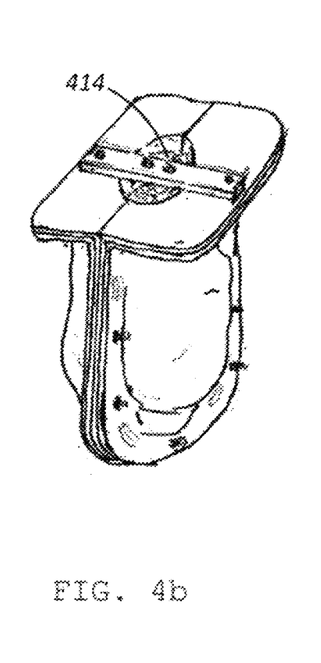
Figure 4C:
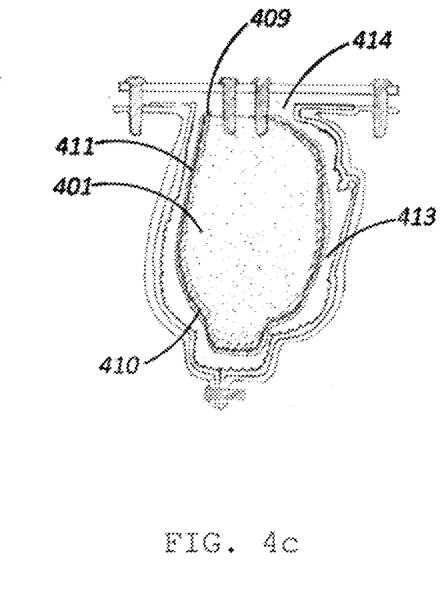
Figure 5A:
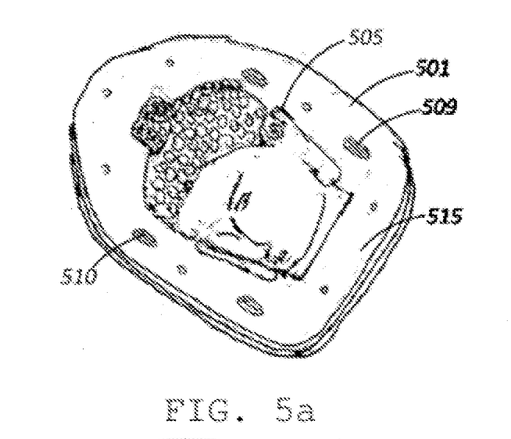
FIGS. 5a-5h show a method for minimizing the width of seam lines of decorative products by using a paste shaping tool according to a preferred embodiment of the present invention.
Figure 5B:
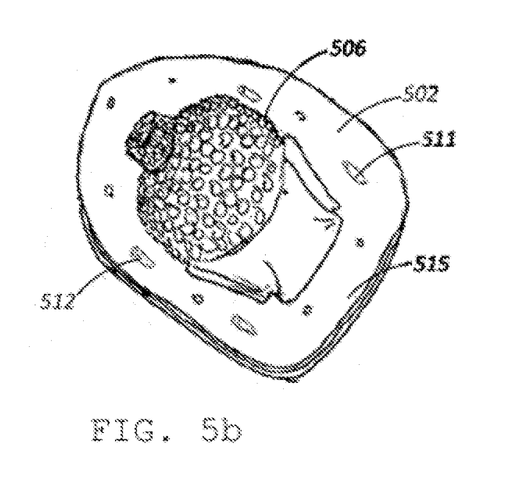
Figure 5C:
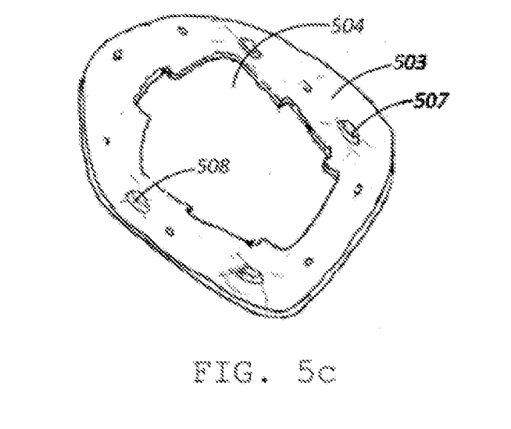
Figure 5D:
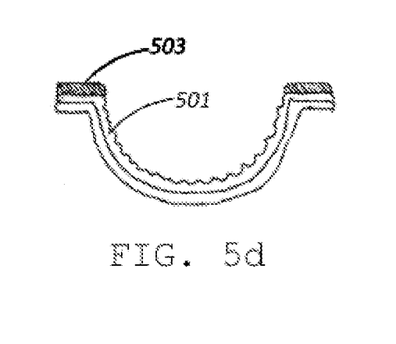
Figure 5E:
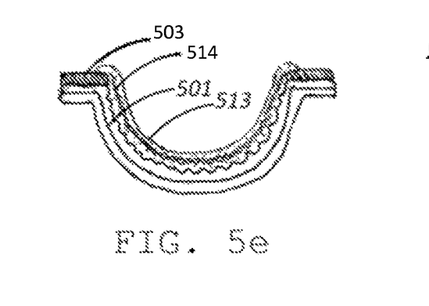
Figure 5F:
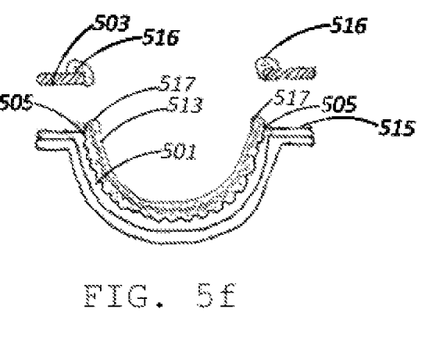
Figure 5G:
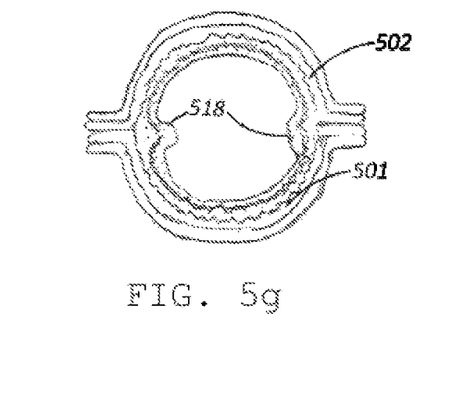
Figure 5H:
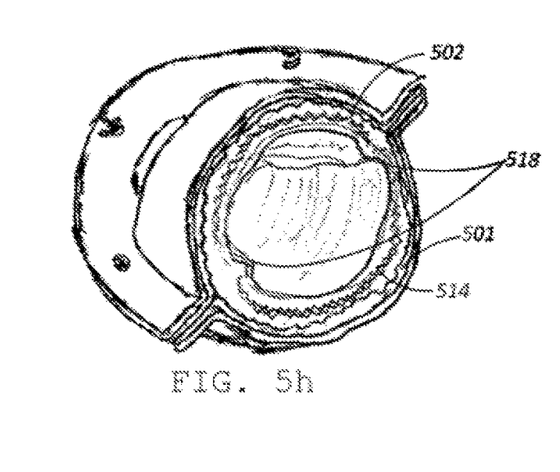

FIGS. 4a-4c illustrate a production method of an ornamental molded product, such as a garden ornament, as another example of the decorative product of the instant invention according to one embodiment of the present invention. This production method is carried out by casting the moldable material into the mold by vacuum casting, as contrasted to the hand or spray casting process employed in the production method described above. The core of garden ornament (401) is manufactured prior to the casting of moldable materials. The density of the said core (401) can be selected according to the preferred final product weight; for example, a stainless steel core can be used if a heavy final product weight is preferred; in contrast, a hollow paper box can be used if light final product weight is preferred. One of the choices of said core (401) is cured MOC2 as afore-described. As said core (401) does not comprise intricate carvings, inlayed works and embossed shape, using wood, stones, metals, paper or gas to make the core (401) is not time consuming and preferred in one embodiment of the instant invention. Products with gas core are conventionally referred to be hollow products. Said core (401) is characterized in having geometry similar to the final garden ornament. The core (401) is fixed to a bar (404) using screws (405, 406) and said bar (404) will then be fixed to the mold by screws (407, 408) after assembly of the mold parts. Thus, the core (401) is fixed onto the bar (404) at the position that, after assembly of mold parts, the core (401) will not be in contact with the mold and the clearance between the core (401) and the mold parts (402, 403) will be kept at above 5 millimeters. A selected formulation of fiber reinforced MOC paste (409) is casted on the core (401) by hand casting or spray casting prior to the assembly of the mold parts. Said fiber reinforced MOC can be MOC1 paste as afore-described in a preferred embodiment. With the said fiber reinforced MOC paste (409) casted onto the core (401), a fiber mat (410) can be applied on to the core (401). Another layer of said fiber reinforced MOC paste (411) is casted on to the casted MOC paste (409) and the fiber mat (410) thereon to ensure the fiber mat (410) is attached to the core (401). The mold parts (402, 403) are then assembled (408).

In a preferred embodiment of the instant invention, another selected formulation of the fiber reinforced MOC paste (MOC3) is first treated under vacuum. In one exemplary embodiment. the composition of said MOC3 is listed in Table 3 below. As MOC3 is intended to be used in vacuum casting, thus, the fluidity of said MOC3 should be good. With the utilization of high-activity calcined magnesium oxide and the addition of polycarboxylate, the fluidity of said MOC3 paste is larger than that of the conventional MOC paste. The slump test value of MOC3 should be above 160 mm. Said MOC3 is then filled into the remaining cavity (413) of the assembled mold (408) via the filling port (414) of the mold (408) at vacuum or atmospheric condition. The fully filled mold is then treated at low pressure or at vacuum prior to the final setting of MOC3 at atmospheric condition. Demolding time at atmospheric condition would be shorter than 8 hours. After demolding, screws (405, 406) are unscrewed, thus, leaving two holes in the products. Vacuum treated MOC3 can be used to fill the holes. When the MOC3 inside the said holes is cured, the final decorative product possesses a rigid shell of compacted F-5 MOC.

As the molds are assembled prior to the casting of moldable materials, seam lines of the products can be easily kept at less than 2 millimeters. With the incorporation of the core (401), the product weight can be controlled and the dimensional stability of the product can be ensured by the application of the fiber mat (410). The co-existence of tributyl phosphate and polymethylhydrogensiloxane-polydimethylsiloxane mixture in MOC3 enhances the weathering resistance, durability and the formation of compacted F-5 MOC; thus, said MOC3 is more suitable than other MOC for outdoor garden ornament.

TABLE 3

| Ingredients | Composition (weight percent) |
| --- | --- |
| Calcined Magnesium Oxide (Activity of above 60 weight percent) | 45-50 |
| Magnesium Chloride Hexahydrate (Purity of above 95 weight percent) | 17-19 |
| Water | 17-19 |
| Phosphoric Acid (Purity of above 80 weight percent) | 0.2-0.5 |
| Sodium Dihydrogenphosphate Monohydrate (Purity of above 98 weight percent) | 0.1-0.2 |
| Calcium Silicate (Purity of above 90 weight percent) | 0.5-1 |
| Iron II Sulphate heptahydrate (Purity of above 95 weight percent) | 0.8-1 |
| Tributyl phosphate (Purity of above 90 weight percent) | 0.5-1 |
| Polymethylhydrogensiloxane - Polydimethylsiloxane mixture (Purity of around 25 weight for each compound) | 1.0-2.0 |
| Activated Silicon Oxides (including Coal Fly Ash) (Activity of around 50 weight percent) | 5.0-12.0 |
| Polycarboxylate (Purity of about 20 weight percent) | 1.0-3.0 |
| E Class Glass Fiber (can be replaced by Plastic fibers or vegetal fibers) | 1.0-2.0 |

FIGS. 5a-5h shows a paste shaping method that can minimize the width of seam lines of the decorative products of the instant invention when hand casting or spray casting of moldable materials is used. A Buddha's head, as an example of the decorative product illustrated in FIGS. 5a-5h, can be manufactured by using the mold parts (501, 502). Due to the configuration of the mold parts (501, 502), hand casting and spray casting are the suitable and preferred choices for the production of the decorative products. A piece of paste shaping tool (503) can be used to minimize the width of seam lines of the products to below 2 millimeters. The paste shaping tool (503) comprises a hole (504) in which size thereof exactly matches with the parting lines (505, 506) of the mold parts (501, 502). The paste shaping tool (503) is further characterized in including means (such as protrusions, screw holes, etc.) (507, 508) to fix its position onto mold parts (501, 502) by coupling with the corresponding positioning means (such as recesses) (509-512) on both mold parts (501, 502). To minimize the seam lines of the product, the paste shaping tool (503) is placed on top of the mold parts (501, 502) as shown in the cross sectional view of the mold part (501). MOC paste (513) is then casted onto the mold parts (501) by hand casting or spray casting. A fiber mat (514) can also be applied. With the paste shaping tool (503), MOC paste can then be masked from casting onto the section of the mold parts (501) where the paste should not be casted thereon, for example, section (515) as shown in FIGS. 5a-5h. After the completion of casting on one of the mold parts (501), the paste shaping tool (503) can be removed with the excessive paste (516), thus, leaving convex paste ridge (517) at the position adjacent to the mold parting line (505). The same procedures are repeated for casting MOC paste onto another mold part (502). After that, the mold parts (501, 502) can be assembled. The convex paste ridges (516) on the mold parts (501, 502) then merge to form a large ridge (518) along the mold parting lines (505) inside the assembled mold. As there is no excessive paste on places that should not be casted, thick seam lines can only be formed by the paste squeezed out when the two convex paste ridges (516) crash on each other. Due to the fluid mechanics of the paste, the two convex paste ridges (516) would tend to form a large ridge (518) inside the assembled mold instead of squeezing out through the narrow gap between the two different mold parts (501, 502) during the mold assembling process. As a result, the seam lines of the decorative product would be kept below 2 millimeters by using the paste shaping tool during the paste casting process.

The invention is exemplified by the following, non-limiting, examples.

Example 1

1.5 kilograms of MOC1 was mixed at vacuum condition. The resulting MOC1 paste was casted onto the female mold (101) and male mold (105) as shown in FIG. 1. 2 kilograms of MOC2 was mixed under atmospheric condition. The resulting MOC2 paste from the atmospheric mixing process was casted on top of the casted vacuum mixed MOC1 paste of the female mold (105) and filled up 75 percent of the remaining mold cavity. The excess paste was scrapped after the assembly of the male mold (101) and female mold (105). The pastes were allowed to cure, expand and set. The foamed paste squeezed out was then scraped prior to the demolding process. Any surface deflect of the demolded mirror frame was fixed and the fixed mirror frame is painted to yield the final products.

The combustibility of the painted mirror frame was tested according to ASTM E136 and BS476 part 4 and the result showed that the mirror frame was non-combustible. Said painted mirror frame was also tested for the volatile organic compound emission according to the standard test method ASTM D5116 and it was found that the mirror frame is free of volatile organic compound emission. The durability of the mirror frame is tested according to ASTM G154 and it was found that the mirror frame is of excellent durability under UV exposure. The in-house carbon dioxide absorption test was conducted by checking on the carbonation depth of the porous core and the rigid shell. The result showed that the depth of carbonation of the porous core was deeper than that of the rigid shell.

Example 2

Conventionally, it is impossible to make a Buddha's head decoration of weight heavier than 10 kilograms using MOC paste and the mold shown in FIG. 4 since the density of MOC paste can never reach a value of higher than 5.0 kilograms per liter. However, by using a preferred embodiment of the instant invention as shown in FIG. 4, it is possible to make said Buddha's head decoration. First, a core was made by carbon steel, which weighed 6 kilograms. Said core was then fixed on to a steel bar (404), after the assembly to the mold parts, the clearance between the core and the mold parts (402, 403) was about 7 millimeters. 4 kilograms of MOC3 was mixed at vacuum condition and the resulting MOC3 paste was then casted onto the said carbon steel core by hand casting. A fiber mat was applied on the top of the hand casted MOC3 paste. Then, the mold parts were assembled. The remaining MOC3 paste was filled into the remaining mold cavity (409). The filled mold was then treated in vacuum to eliminate the possible voids and internal bubbles inside the MOC3 paste. After the vacuum treatment, the filled mold was placed at atmospheric condition for the curing and setting of the MOC3 paste. The Buddha's head was then demolded and the screws (405, 406) were unscrewed. The screw holes were filled by vacuum treated MOC3 to result in the final Buddha's head decoration.

The final weight of the finished Buddha's head decoration was around 10 kilograms. The combustibility of the Buddha's head was tested according to ASTM E136 and BS476 part 4 and the result showed that the Buddha's head decoration was non-combustible. Said Buddha's head decoration was also tested for the volatile organic compound emission according to the standard test method ASTM D5116 and it was found that the Buddha's head decoration is free of volatile organic compound emission. The durability of the Buddha's head decoration was tested according to ASTM G154, it was found that the Buddha's head decoration has even better durability than the mirror frame manufactured in Example 1. This should be due to the differences in the MOC formulations thereof. MOC3 formulation in the Buddha's head decoration comprises Polymethylhydrogensiloxane-Polydimethylsiloxane mixture which improves the stability and water resistance of the resulting MOC3 formulation, whereas MOC1 formulation in the mirror flame lacks this ingredient and so it has a weaker stability and water resistance relative to the Buddha's head decoration.

Example 3

Paste shaping tool (503) was used to minimize the seam lines of decorative products that are manufactured according to the process illustrated in FIGS. 5a-5h by using mold parts (501, 502) and hand casting of said MOC1. 50 pieces of such products were produced in which the average width of the seam lines found on the product was 1.4 millimeters.

Example 4

Different MOC pastes, namely MOC1 paste without the addition of calcium silicate and tributyl phosphate (P1), MOC1 paste without the addition of tributyl Phosphate (P2), MOC1 paste with ingredients and compositions as shown in Table 1 (P3), MOC2 paste with ingredients and compositions as shown in Table 2 (P4) and MOC3 paste with ingredients and compositions as shown in Table 3 (P5) were prepared. Part of the pastes P1, P3 and P4 were not treated at vacuum condition, while other pastes were all treated at vacuum condition. Then all pastes were used to make specimens for different tests. The test results of different cured MOC pastes are summarized in Table 4 below.

TABLE 4

| Paste | Vacuum Treatment | Density (kilogram per liter) | Flexural Strength (MPa) | Water Resistance (Days) | Durability Factor | Durability |
|---|---|---|---|---|---|---|
| P1 | No | 1.82 | 12.1 | 4 | 0.67 | Medium |
|  | Yes | 1.85 | 12.6 | 5 | 0.65 | Medium |
| P2 | Yes | 1.85 | 15.3 | 7 | 0.75 | Good |
| P3 | No | 1.88 | 15.8 | 10 | 0.79 | Good |
|  | Yes | 1.95 | 17.4 | 18 | 0.84 | Excellent |
| P4 | No | 0.88 | 6.4 | 6 | 0.70 | Excellent |
| P5 | Yes | 1.96 | 19.8 | 30 | 0.92 | Perfect |

Water Resistance of the sample was assessed by first immersing the specimens into water in which the number of days at which the flexural strength of the specimens falls below 80% of its original value was recorded. Thus, the result of a larger number of days implies a better water resistance. The flexural strength of the samples was tested according to ASTM C947 which is a standard method (as set forth by the ASTM International) for testing the flexural properties of a material. The durability factor of the samples was tested according to ASTM C666 which is a standard method (as set forth by the ASTM International) for testing the freeze thaw resistance of materials. The durability of the specimens was tested according to ASTM G154 which is a method (as set forth by the ASTM International) for testing the UV and weathering resistances of materials.

As shown in the Table 4 above, vacuum treatment on MOC pastes increases the density of MOC pastes, and the addition of tributyl phosphate and polymethylhydrogensiloxane-polydimethylsiloxane mixture enlarges the extent of such density increment. Thus, vacuum treatment with the addition of tributyl phosphate and polymethylhydrogensiloxane-polydimethylsiloxane mixture made the MOC structure more compact.

Moreover, the addition of tributy phosphate and polymethylhydrogensiloxane-polydimethylsiloxane mixture improves the water resistance and weathering resistance of MOC paste. Such addition even leads to an enhanced improvement in these two properties as compared to the traditional improvement method of MOC, in which ionic phosphates and activated silicon oxide are used.

The addition of calcium silicate also showed a dramatic improvement on the product's strength, water resistance and durability. It was also found that the efflorescence can be greatly reduced by using calcium silicate as additive of MOC pastes.

It should also be understood that certain features of the invention, which are, for clarity, described in the context of separate embodiments, may be provided in combination in a single embodiment. Conversely, various features of the invention which are, for brevity, described in the context of a single embodiment, may also be provided separately or in any appropriate sub-combinations.

For example, a bar (404) as shown in FIG. 4a is used to fix the mold parts (402, 403) and the core (401), but other fixing means such as a hook, wood and nails, steel wires can also be used to ensure that the mold parts (402, 403) and the core (401) are kept a position that the core (401) would not be in touch with the assembled mold with a clearance therebetween to be kept at a desired distance.

Also, steps for refinement of the final product, such as steps involving hole-filling described in the production method illustrated in FIGS. 4a-4c, can be varied according to the user's choice and desire.

What is claimed is:

1. A moldable material comprising a mixture of calcined magnesium oxide, magnesium chloride, phosphoric acid, sodium dihydrogenphosphate, calcium silicate, iron II sulphate, tributyl phosphate, activated silicon oxides, and fiber.

2. The moldable material according to claim 1 wherein said moldable material has no internal voids with an enhanced fluidity property of a slump test value of at least 120 mm.

3. The moldable material according to claim 1 wherein said fiber is selected from a group consisting of E class glass fiber, plastic fibers, vegetal fibers, or a combination thereof; said activated silicon oxides is coal fly ash.

4. The moldable material according to claim 1 further comprising polymethylhydrogensiloxane-polydimethylsiloxane and polycarboxylate.

5. The moldable material according to claim 4 wherein said moldable material has an enhanced fluidity property with a slump test value of at least 160 mm.

6. The moldable material according to claim 4 wherein said fiber is selected from a group consisting of E class glass fiber, plastic fibers, vegetal fibers, or a combination thereof; said activated silicon oxides is coal fly ash.

7. A moldable material obtained by a process comprising mixing the components of calcined magnesium oxide, magnesium chloride hexahydrate, water, phosphoric acid, sodium dihydrogenphosphate monohydrate, calcium silicate, iron II sulphate heptahydrate, tributyl phosphate, activated silicon oxides, polycarboxylate, and fiber at vacuum condition.

8. The moldable material according to claim 7 wherein said fiber is selected from a group consisting of E class glass fiber, plastic fibers, vegetal fibers, or a combination thereof; said activated silicon oxides is coal fly ash.

9. The moldable material according to claim 8 further comprising the composition of:
a. said calcined magnesium oxide ranging from 49-51 weight percent;
b. said magnesium chloride hexahydrate ranging from 17-19 weight percent;
c. said water ranging from 17-19 weight percent;
d. said phosphoric acid ranging from 0.2-0.5 weight percent;
e. said sodium dihydrogenphosphate monohydrate ranging from 0.1-0.2 weight percent;
f. said calcium silicate ranging from 0.5-1.0 weight percent;
g. said iron II sulphate heptahydrate ranging from 0.8-1.0 weight percent;
h. said tributyl phosphate ranging from 0.5-1.0 weight percent;
i. said activated silicon oxides ranging from 5.0-12 weight percent; and
j. said fiber is E class glass fiber ranging from 0.5-1.0 weight percent.

10. A moldable material obtained by a process comprising mixing the components of calcined magnesium oxide, magnesium chloride hexahydrate, water, phosphoric acid, sodium dihydrogenphosphate monohydrate, calcium silicate, iron II sulphate heptahydrate, tributyl phosphate, polymethylhydrogensiloxane-polydimethylsiloxane mixture, activated silicon oxides, polycarboxylate, and fiber at vacuum condition.

11. The moldable material according to claim 10 wherein said fiber is selected from a group consisting of E class glass fiber, plastic fibers, vegetal fibers, or a combination thereof; said activated silicon oxides is coal fly ash.

12. The moldable material according to claim 11 further comprising the composition of:
a. said calcined magnesium oxide ranging from 45-50 weight percent;
b. said magnesium chloride hexahydrate ranging from 17-19 weight percent;
c. said water ranging from 17-19 weight percent;
d. said phosphoric acid ranging from 0.2-0.5 weight percent;
e. said sodium dihydrogenphosphate monohydrate ranging from 0.1-0.2 weight percent;
f. said calcium silicate ranging from 0.5-1.0 weight percent;
g. said iron II sulphate heptahydrate ranging from 0.8-1.0 weight percent;
h. said tributyl phosphate ranging from 0.5-1.0 weight percent;
i. said polymethylhydrogensiloxane-polydimethylsiloxane mixture ranging from 1.0-2.0 weight percent;
j. said activated silicon oxides ranging from 5.0-12 weight percent;
k. said polycarboxylate ranging from 1.0-3.0 weight percent; and
l. said fiber is E class glass fiber ranging from 1.0-2.0 weight percent.

13. A moldable material comprising a mixture of calcined magnesium oxide, magnesium chloride, phosphoric acid, sodium dihydrogenphosphate, calcium silicate, iron II sulphate, activated silicon oxides, fiber, and a foaming agent.

14. The moldable material according to claim 13 wherein said moldable material has an ability to expand the volume thereof by at least 50% and to decrease the density thereof by at least 25% and within a range of 0.8-1.5 kg/L.

15. The moldable material according to claim 13 wherein said fiber is selected from a group consisting of E class glass fiber, plastic fibers, vegetal fibers, or a combination thereof; said activated silicon oxides is coal fly ash.

16. The moldable material according to claim 13 wherein said foaming agent is an inorganic foaming agent selected from a group consisting of hydrogen peroxide, aluminum powder, and sodium bicarbonate.

17. The moldable material according to claim 13 wherein said moldable material is obtained by a process comprising mixing the components of calcined magnesium oxide, magnesium chloride hexahydrate, water, phosphoric acid, sodium dihydrogenphosphate monohydrate, calcium silicate, iron II sulphate heptahydrate, activated silicon oxides, fiber, and foaming agent at atmospheric condition.

18. The moldable material according to claim 17 further comprising the composition of:
a. said calcined magnesium oxide ranging from 49-51 weight percent;
b. said magnesium chloride hexahydrate ranging from 17-19 weight percent;
c. said water ranging from 17-19 weight percent;
d. said phosphoric acid ranging from 0.2-0.5 weight percent;
e. said sodium dihydrogenphosphate monohydrate ranging from 0.1-0.2 weight percent;
f. said calcium silicate ranging from 0.5-1.0 weight percent;
g. said iron II sulphate heptahydrate ranging from 0.8-1.0 weight percent;

h. said hydrogen peroxide ranging from 1.0-2.0 weight percent;
i. said foaming agent is activated silicon oxides ranging from 5.0-12 weight percent; and
j. said fiber is E class glass fiber ranging from 1.0-2.0 weight percent.

* * * * *